(12) United States Patent
Roth et al.

(10) Patent No.: US 9,410,509 B2
(45) Date of Patent: Aug. 9, 2016

(54) ADAPTIVE INDIVIDUAL-CYLINDER THERMAL STATE CONTROL USING INTAKE AIR HEATING FOR A GDCI ENGINE

(71) Applicant: DELPHI TECHNLOGIES, INC., Troy, MI (US)

(72) Inventors: Gregory T. Roth, Davison, MI (US); Mark C. Sellnau, Bloomfield Hills, MI (US)

(73) Assignee: Delphi Technologies, Inc., Troy, MI (US)

(*) Notice: Subject to any disclaimer, the term of this patent is extended or adjusted under 35 U.S.C. 154(b) by 292 days.

(21) Appl. No.: 14/096,109

(22) Filed: Dec. 4, 2013

(65) Prior Publication Data

US 2015/0152817 A1    Jun. 4, 2015

(51) Int. Cl.
| | |
|---|---|
| F02M 31/04 | (2006.01) |
| F02D 35/02 | (2006.01) |
| F02B 29/04 | (2006.01) |
| F02B 37/04 | (2006.01) |
| F02B 39/04 | (2006.01) |
| F02D 41/02 | (2006.01) |

(52) U.S. Cl.
CPC ............ *F02M 31/042* (2013.01); *F02D 35/02* (2013.01); *F02B 29/0418* (2013.01); *F02B 29/0443* (2013.01); *F02B 37/04* (2013.01); *F02B 39/04* (2013.01); *F02D 35/023* (2013.01); *F02D 35/025* (2013.01); *F02D 35/028* (2013.01); *F02D 41/024* (2013.01); *F02D 2200/025* (2013.01); *F02D 2200/0414* (2013.01); *Y02T 10/126* (2013.01)

(58) Field of Classification Search
CPC ............ F02B 1/12; F02B 3/06; F02M 25/07; F02M 31/04; F02M 31/042; Y02T 10/126

USPC .................. 123/41.1, 41.12, 41.14, 41.31, 123/41.35–41.38, 41.52, 298, 435, 434, 123/549–554, 688; 60/599; 701/106, 108
See application file for complete search history.

(56) References Cited

U.S. PATENT DOCUMENTS

| | | | | |
|---|---|---|---|---|
| 3,975,951 | A * | 8/1976 | Kohama | F02D 41/187 123/494 |
| 4,089,214 | A * | 5/1978 | Egami | F02D 41/187 123/487 |
| 5,107,812 | A * | 4/1992 | Takamoto | F02D 41/187 123/406.65 |
| 5,816,231 | A * | 10/1998 | Inoue | F01N 11/007 123/689 |
| 5,852,228 | A * | 12/1998 | Yamashita | G01N 27/4067 123/697 |
| 6,185,998 | B1 * | 2/2001 | Yonezawa | F02M 35/021 73/114.34 |
| 6,186,125 | B1 * | 2/2001 | Gehling | F02M 31/16 123/556 |
| 6,205,989 | B1 * | 3/2001 | Aoki | F02D 41/1455 123/688 |

(Continued)

*Primary Examiner* — John Kwon
*Assistant Examiner* — Johnny H Hoang
(74) *Attorney, Agent, or Firm* — Joshua M. Daines

(57) ABSTRACT

A system for a multi-cylinder compression ignition engine includes a plurality of heaters, at least one heater per cylinder, with each heater configured to heat air introduced into a cylinder. Independent control of the heaters is provided on a cylinder-by-cylinder basis. A combustion parameter is determined for combustion in each cylinder of the engine, and control of the heater for that cylinder is based on the value of the combustion parameter for combustion in that cylinder. A method for influencing combustion in a multi-cylinder compression ignition engine, including determining a combustion parameter for combustion taking place in a cylinder of the engine and controlling a heater configured to heat air introduced into that cylinder, is also provided.

20 Claims, 5 Drawing Sheets

(56) References Cited

U.S. PATENT DOCUMENTS

| | | | | |
|---|---|---|---|---|
| 6,276,334 B1* | 8/2001 | Flynn | F02B 19/14 123/435 |
| 6,304,813 B1* | 10/2001 | Ikeda | F02D 41/1494 123/697 |
| 6,405,793 B1* | 6/2002 | Ghodbane | B60H 1/00007 165/140 |
| 8,939,134 B2* | 1/2015 | Sato | B60K 6/46 123/690 |
| 2006/0249102 A1* | 11/2006 | Morgan | F02B 47/02 123/25 J |
| 2007/0006860 A1* | 1/2007 | Nakamura | F02D 41/1495 123/688 |
| 2012/0261398 A1* | 10/2012 | Takahashi | B60H 1/00407 219/205 |
| 2013/0213349 A1 | 8/2013 | Sellnau et al. | |
| 2013/0298554 A1 | 11/2013 | Sellnau | |
| 2013/0333673 A1* | 12/2013 | Frick | F02M 31/04 123/557 |

* cited by examiner

ADAPTIVE INDIVIDUAL-CYLINDER THERMAL STATE CONTROL USING INTAKE AIR HEATING FOR A GDCI ENGINE

STATEMENT REGARDING FEDERALLY SPONSORED RESEARCH OR DEVELOPMENT

This invention was made with government support under Contract No. DE-EE0003258 awarded by the Department of Energy. The government has certain rights in the invention.

BACKGROUND OF THE INVENTION

Gasoline Direct-injection Compression-Ignition (GDCI) is an engine combustion process that shows promise in improving engine emissions performance and efficiency. GDCI provides low-temperature combustion for high efficiency, low NOx, and low particulate emissions over the complete engine operating range. Low-temperature combustion of gasoline may be achieved using multiple late injection (MLI), intake boost, and moderate EGR. GDCI engine operation is described in detail in U.S. Patent Application Publication 2013/0213349A1, the entire contents of which are hereby incorporated herein by reference.

The autoignition properties of gasoline-like fuels require relatively precise control of the thermal state within each combustion chamber to maintain robust combustion in each individual cylinder of a multiple-cylinder engine. Due to cylinder-to-cylinder variation in a multiple cylinder engine, improvements in temperature control are desired.

BRIEF SUMMARY OF THE INVENTION

In a first aspect of the invention, a system for selectively adding heat to combustion chambers of a multi-cylinder engine is provided. The system includes a plurality of intake air heaters, each configured to heat air introduced to the intake port of an engine cylinder. Power to each heater is controllable so as to provide the ability to provide heat to an individual cylinder independent of heat provided to a different cylinder in the engine.

In a second aspect of the invention, a method for selectively adding heat to combustion chambers of a multi-cylinder engine is provided. The method includes controlling electrical power to a plurality of heaters, each heater configured to heat air introduced into a cylinder of the engine. Energy to each heater is controlled individually so as to provide individually controllable heating to each combustion chamber in the engine.

DETAILED DESCRIPTION OF THE INVENTION

Figure 1:
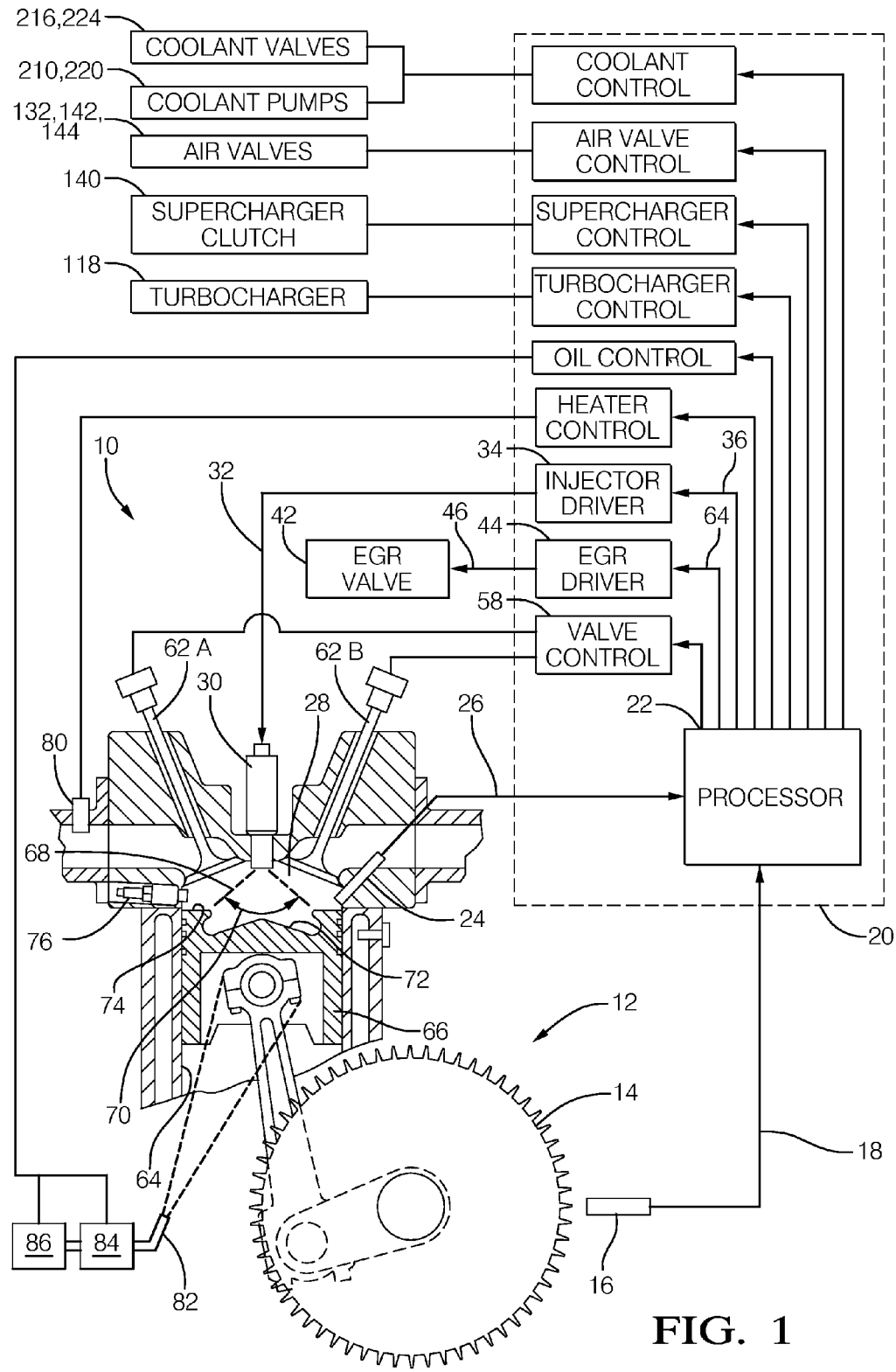
FIG. 1 is a schematic view of an embodiment of an engine control system suitable for controlling a single cylinder of a GDCI engine.

FIG. 1 illustrates a non-limiting embodiment of an engine control system 10 suitable for controlling a single cylinder portion of a GDCI internal combustion engine 12. The engine 12 is illustrated as having a single cylinder bore 64 containing a piston 66, wherein the region above the piston 66 defines a combustion chamber 28. The system 10 may include a toothed crank wheel 14 and a crank sensor 16 positioned proximate to the crank wheel 14 such that the crank sensor 16 is able to sense rotational movement of the crank wheel teeth and output a crank signal 18 indicative of a crank angle and a crank speed.

The engine control system 10 may also include a controller 20, such as an engine control module (ECM), configured to determine a crank angle and a crank speed based on the crank signal 18. The controller 20 may include a processor 22 or other control circuitry as should be evident to those in the art. The controller 20 or processor 22 may include memory, including non-volatile memory, such as electrically erasable programmable read-only memory (EEPROM) for storing one or more routines, thresholds and captured data. The one or more routines may be executed by the processor 22 to perform steps for determining a prior engine control parameter and scheduling a future engine control signal such that a future engine control parameter corresponds to a desired engine control parameter. FIG. 1 illustrates the processor 22 and other functional blocks as being part of the controller 20. However, it will be appreciated that it is not required that the processor 22 and other functional blocks be assembled within a single housing, and that they may be distributed about the engine 12.

Continuing to refer to FIG. 1, the engine control system 10 may include a combustion sensing means 24 configured to output a combustion signal 26 indicative of a combustion characteristic of a combustion event occurring within the combustion chamber 28. One way to monitor the progress of a combustion event is to determine a heat release rate or cumulative heat release for the combustion event. However, because of the number and complexity of measurements, determining heat release may not be suitable for controlling engines during field use such as when engines are operated in vehicles traveling in uncontrolled environments like public roadways. A combustion detection means suitable for field use may provide an indication of a combustion characteristic that can be correlated to laboratory type measurements such as heat release. Exemplary combustion detection means 24 may include a pressure sensor configured to sense the pressure within the combustion chamber 28. Another device that may be useful for indicating some aspect of the combustion process is a combustion knock sensor. The combustion detection means 24 may be any one of the exemplary sensors, or a combination of two or more sensors arranged to provide an indication of a combustion characteristic.

The engine control system 10 includes one or more engine control devices operable to control an engine control parameter in response to an engine control signal, wherein the engine control parameter influences when autoignition occurs. One example of an engine control device is a fuel injector 30 adapted to dispense fuel 68 in accordance with an injector control signal 32 output by an injector driver 34 in response to an injection signal 36 output by the processor 22. The fuel injection profile may include a plurality of injection events. Controllable aspects of the fuel injection profile may include how quickly or slowly the fuel injector 30 is turned on and/or turned off, a fuel rate of fuel 68 dispensed by the fuel injector 30 while the fuel injector 30 is on, the initiation timing and duration of one or more fuel injections as a function of engine crank angle, or the number of fuel injections dispensed to achieve a combustion event. Varying one or more of these aspects of the fuel injections profile may be effective to control autoignition.

The exemplary engine control system 10 includes an exhaust gas recirculation (EGR) valve 42. While not explicitly shown, it is understood by those familiar with the art of engine control that the EGR valve regulates a rate or amount of engine exhaust gas that is mixed with fresh air being supplied to the engine to dilute the percentage of oxygen and/or nitrogen in the air mixture received into the combustion chamber 28. The controller 20 may include an EGR driver 44 that outputs an EGR control signal 46 to control the position of the EGR valve 42. In a non-limiting embodiment, the EGR driver may, for example, pulse width modulate a voltage to generate an EGR control signal 46 effective to control the EGR valve to regulate the flow rate of exhaust gases received by the engine 12. In an alternative non-limiting embodiment, the EGR valve may be commanded to a desired position by control of a torque motor actuator.

Referring again to FIG. 1, the engine control system 10 may include other engine management devices. For example the engine control system 10 may include a turbocharger 118. The turbocharger 118 receives a turbocharger control signal from a turbocharger control block that may control a boost pressure by controlling the position of a waste gate or bypass valve, or controlling a vane position in a variable geometry turbocharger. The engine control system 10 may also include a supercharger driven by the engine through a supercharger clutch 140, the supercharger clutch 140 being controlled by a supercharger control block in the controller 20. The engine control system 10 may also include a valve control block 58 that may directly control the actuation of engine intake valve 62A and exhaust valve 62B, or may control the phase of a cam (not shown) actuating the intake valve 62A and/or the exhaust valve 62B.

Still with reference to FIG. 1, the engine control system 10 may include one or more intake air heaters 80 configured to heat air at the intake manifold or intake port of each cylinder. Each intake air heater 80 is controllable by a control signal received from an intake air heater control block in a manner to be discussed in further detail below.

Also indicated in FIG. 1 are a nozzle 82 configured to spray oil onto the bottom of the piston 66 to provide cooling of the piston 66. Oil flow to the nozzle 82 is provided by an oil pump 86 that supplies oil to the nozzle 82 through an oil control valve 84. Control of the oil pump 86 and/or of the oil control valve 84 is provided through an oil control block in the controller 20 in a manner to be discussed in further detail below.

Although not specifically indicated in FIG. 1, the engine control system 10 may include additional sensors to measure temperature and/or pressure at locations within the air intake system and/or the engine exhaust system. Also, it is to be noted that the embodiment depicted in FIG. 1 may contain components that are not essential to operate a GDCI engine but may offer benefits if included in an implementation of a GDCI engine system.

Figure 2:
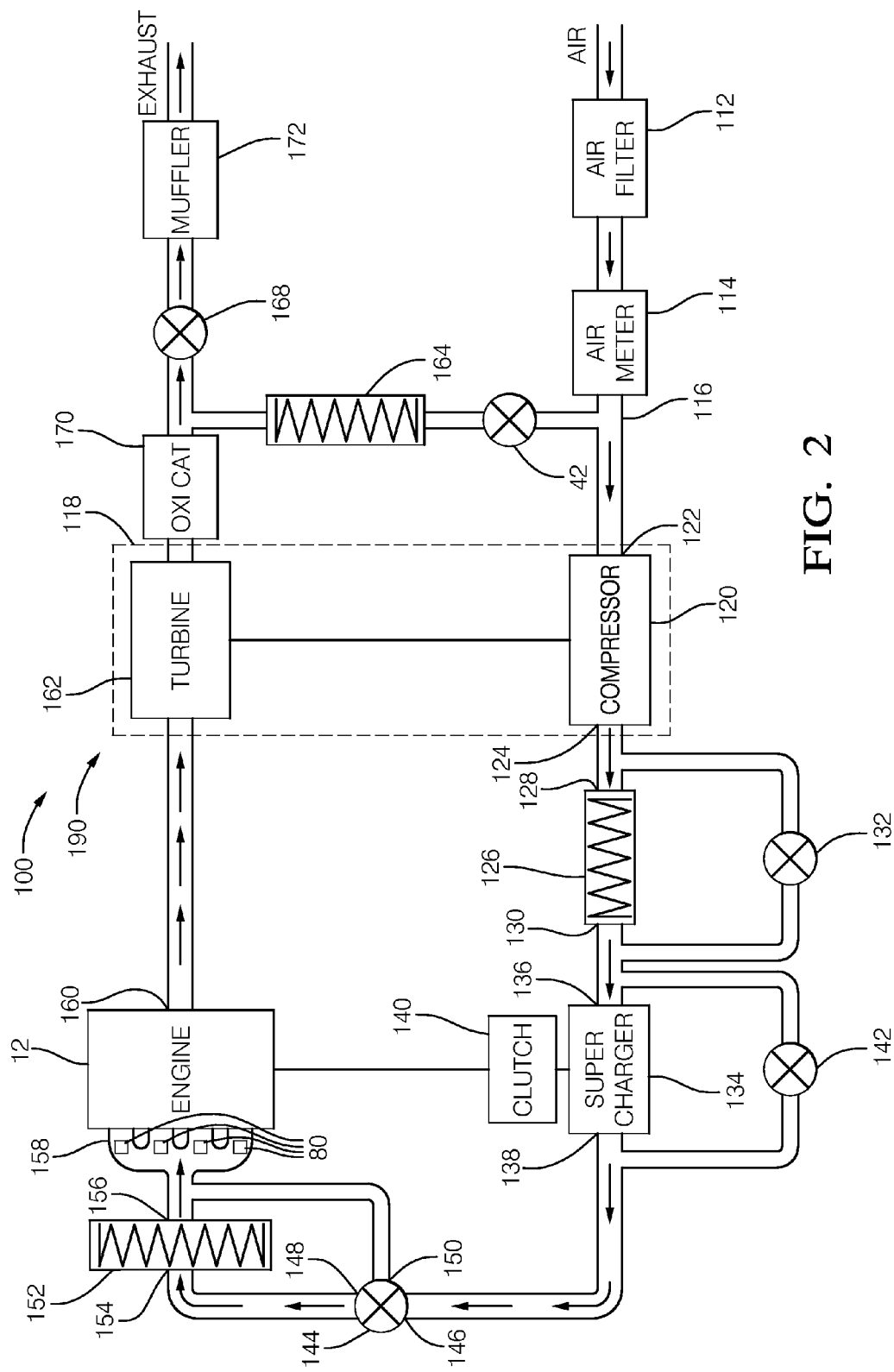
FIG. 2 is a block diagram of an embodiment of the gas (air and/or exhaust) paths of an engine system.

FIG. 2 is a block diagram of a non-limiting embodiment of the gas paths 190 of a GDCI system usable with the engine 12 of FIG. 1. This diagram depicts the routing and conditioning of gases (e.g. air and exhaust gas) in the system. It will be appreciated that configurations other than that shown in FIG. 2, for example a configuration using a single air cooler, may be feasible.

Referring to FIG. 2, air passes through an air filter 112 and a mass airflow sensor 114 into an air duct 116. The air duct 116 channels air into the air inlet 122 of the compressor 120 of a turbocharger 118. Air is then channeled from the air outlet 124 of the compressor 120 to the air inlet 128 of a first charge air cooler 126. The air outlet 130 of the first charge air cooler 126 is connected to the air inlet 136 of a supercharger 134. A first charge air cooler bypass valve 132 is connected between the air inlet 128 and the air outlet 130 of the first charge air cooler 126 to controllably divert air around the first charge air cooler 126.

Continuing to refer to FIG. 2, air at the air outlet 130 of the first charge air cooler 126 is channeled to the air inlet 136 of a supercharger 134, which is driven by the engine 12 through a controllable clutch 140. The air from the air outlet 138 of the supercharger 134 is channeled to a first port 146 of a second charge air cooler bypass valve 144. The second charge air cooler bypass valve 144 in FIG. 2 allows air entering the first port 146 to be controllably channeled to the second port 148, to the third port 150, or to be blended to both the second port 148 and to the third port 150. Air that is channeled through the second port 148 of the second charge air cooler bypass valve 144 enters an air inlet port 154 of a second charge air cooler 152, through which the air passes by way of an air outlet port 156 of the second charge air cooler 152 to an air intake manifold 158 of the engine 12. Air that is channeled through the third port 150 of the second charge air cooler bypass valve 144 passes directly to the air intake manifold 158 of the engine 12 without passing through the second charge air cooler 152. A plurality of air intake heaters 80 is disposed in the air intake manifold 158, with each air intake heater 80 configured to heat air at the intake port of a cylinder of the engine 12.

Still with reference to FIG. 2, engine exhaust gas exits an exhaust port 160 of the engine 12 and is channeled to the turbine 162 of the turbocharger 118. Exhaust gas exiting the turbine 162 passes through a catalytic converter 170. Upon exiting the catalytic converter 170, the exhaust gas can follow one of two paths. A portion of the exhaust gas may pass through an EGR cooler 164 and an EGR valve 42, to be reintroduced into the intake air stream at air duct 116. The remainder of the exhaust gas that is not recirculated through the EGR system passes through a backpressure valve 168, and a muffler 172, to be exhausted out a tail pipe.

Figure 3:
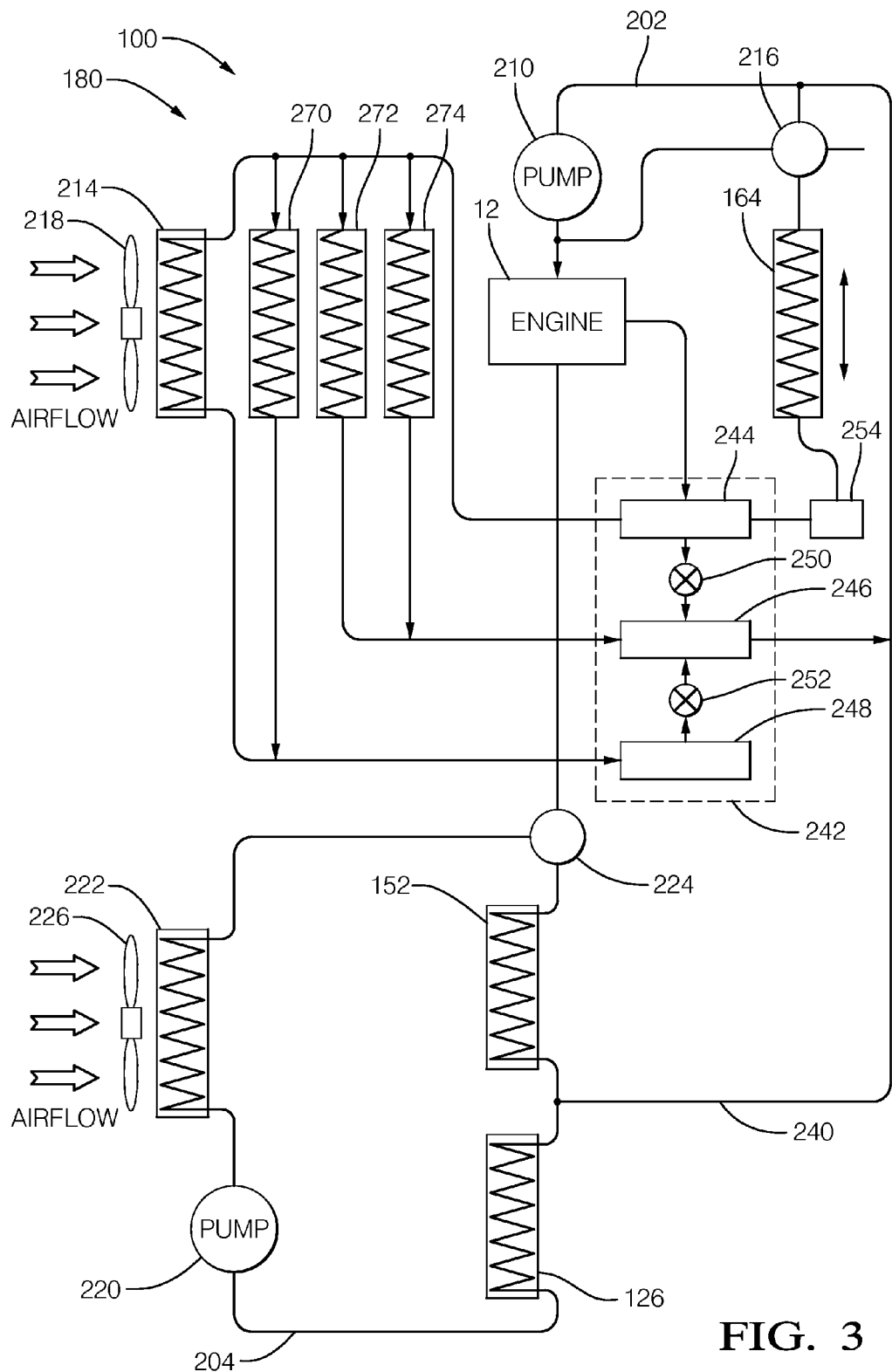
FIG. 3 is a block diagram of an embodiment of the coolant paths of an engine system.

It will be appreciated from the foregoing description of FIG. 2 that the focus of FIG. 2 is on the transport and conditioning of gas constituents, i.e. air into the engine 12 and exhaust gas out of the engine 12. Some of the components in FIG. 2 affect the temperature and/or the pressure of the gas flowing through the component. For example the turbocharger compressor 120 and the supercharger 134 each increase both the temperature and the pressure of air flowing therethrough. The first charge air cooler 126, the second charge air cooler 152, and the EGR cooler 164 are each heat exchangers that affect the temperature of the gas (air or exhaust gas) flowing therethrough by transferring heat from the gas to another medium. In the embodiment of FIGS. 2 and 3, the other heat transfer medium is a liquid coolant, discussed in further detail in relation to FIG. 3. In an alternate embodiment, a gaseous coolant may be used in lieu of a liquid coolant.

FIG. 3 depicts an embodiment of coolant paths 180 of the system 100 for conditioning intake air into an engine 12. FIG. 3 includes several components such as the engine 12, the first charge air cooler 126, the second charge air cooler 152, and the EGR cooler 164 that were previously discussed with respect to their functions in the gas paths 190 of the system 100 depicted in FIG. 2. The coolant system 180 may further include an oil cooler 270, a heat exchanger 272 to provide cooling for the turbocharger 118 and a heater core 274, a temperature sensing device, a pressure sensing device, and/or other components not shown in FIG. 2.

Referring to FIG. 3, the coolant paths 180 of the system 100 for conditioning intake air includes a first coolant loop 202. The first coolant loop 202 includes a first coolant pump 210 configured to urge liquid coolant through coolant passages in the engine 12 and through a first radiator 214. The first coolant pump 210 may conveniently be a mechanical pump driven by rotation of the engine 12. The first radiator 214 may conveniently be a conventional automotive radiator with a controllable first air supply means 218 configured to urge air over the first radiator 214. Preferably the first air supply means 218 comprises a variable speed fan, but the first air supply means 218 may alternatively comprise, by way of non-limiting example, a single speed fan, a two speed fan, a fan of any sort in conjunction with one or more controllable shutters, or the like, without departing from the inventive concept.

Continuing to refer to FIG. 3, the coolant paths 180 of the system 100 includes a thermostat crossover assembly 242 within which is defined a first chamber 244, a second chamber 246, and a third chamber 248. A first thermostat 250 allows fluid communication between the first chamber 244 and the second chamber 246 when the temperature of the coolant at the first thermostat 250 is within a first predetermined range. A second thermostat 252 allows fluid communication between the third chamber 248 and the second chamber 246 when the temperature of the coolant at the second thermostat 252 is within a second predetermined range. It will be appreciated that, while the first chamber 244, the second chamber 246, the third chamber 248, the first thermostat 250, and the second thermostat 252 are depicted as housed in a common enclosure, these components may be otherwise distributed within the system 180 without departing from the inventive concept.

The embodiment depicted in FIG. 3 further includes the EGR cooler 164, one coolant port of which is connected to a four-way coolant valve 216. The other coolant port of EGR cooler 164 is fluidly coupled to the first chamber 244 through an orifice 254.

Continuing to refer to FIG. 3, the coolant paths 180 of the system 100 further includes a second coolant loop 204. The second coolant loop 204 includes a second coolant pump 220 configured to urge liquid coolant through a second radiator 222, the second charge air cooler 152, a three-way coolant valve 224, and the first charge air cooler 126. The second radiator 222 may conveniently be a conventional automotive radiator with a controllable second air supply means 226 configured to urge air over the second radiator 222. Preferably the second air supply means 226 comprises a variable speed fan, but the second air supply means 226 may alternatively comprise, by way of non-limiting example, a single speed fan, a two speed fan, a fan of any sort in conjunction with one or more controllable shutters, or the like, without departing from the inventive concept. Alternately, the second radiator 222 may be positioned in line with the first radiator 214 such that the first air supply means 218 urges air over both the second radiator 222 and the first radiator 214, in which case the second air supply means 226 would not be required.

Coolant communication between the first coolant loop 202 and the second coolant loop 204 is enabled by the three-way coolant valve 224 and a conduit 240. Control of the four-way coolant valve 216 and the three-way coolant valve 224 may be employed to achieve desired temperature conditioning of intake air. Operation of a similar system is disclosed in U.S. patent application Ser. No. 13/469,404 titled "SYSTEM AND METHOD FOR CONDITIONING INTAKE AIR TO AN INTERNAL COMBUSTION ENGINE" filed May 11, 2012, the entire disclosure of which is hereby incorporated herein by reference.

In the preceding discussion relative to FIGS. 1 through 3, it will be appreciated that the engine control system 10 and the system 100 for conditioning intake air contain several components and subsystems that can influence the temperature and pressure within the combustion chamber 28. Of these components and subsystems, there are several that have a global effect on the temperature and/or pressure in all cylinders of a multi-cylinder engine. The turbocharger 118, the supercharger 134, the charge air coolers 126 and 152, the air bypass valves 132, 142, and 146, the EGR cooler 164, the EGR valve 42, the coolant pumps 210, 220, and the coolant valves 216, 224 can be considered "global" components in that they each influence the temperature and/or pressure in the combustion chambers 28 of the engine 12, with the temperature and/or pressure in all combustion chambers 28 of a multi-cylinder engine 12 moving in the same direction as a result of a change in the control setting of one of these "global" components.

The GDCI combustion process has demonstrated very high thermal efficiency and very low NOx and particulate matter emissions. The GDCI combustion process includes injecting gasoline fuel into the cylinder with appropriate injection timing to create a stratified mixture with varying propensity for autoignition. Heat and pressure from the compression process produces autoignition of the air/fuel mixture in the cylinder with burn duration long enough to keep combustion noise low, but with combustion fast enough to achieve high expansion ratio for all fuel that is burned. Fuel injection into each combustion chamber 28 is tailored to optimize the combustion achieved in that combustion chamber 28, as measured by the combustion sensing means 24 associated with that combustion chamber 28. Unlike the "global" components discussed above, the injection of fuel can be controlled to influence the robustness of combustion on a cylinder-by-cylinder basis.

A particular challenge in GDCI combustion is maintaining robust combustion in each combustion chamber. Gasoline fuel has characteristics such that it is resistant to autoignition. As a result, unlike a conventional spark ignition gasoline engine, a GDCI engine requires relatively tight control of the in-cylinder pressure and temperature to robustly achieve and maintain compression ignition.

A multi-cylinder engine presents challenges in matching the characteristics that are important to maintaining robust and stable compression ignition with gasoline fuel. It is known that all cylinders of a multi-cylinder internal combustion engine do not operate at precisely the same conditions. Compression ratio may vary from cylinder-to-cylinder due to manufacturing tolerances, wear, or deposits in a combustion chamber. Temperature may vary from cylinder to cylinder due to differences in heat transfer from the cylinder to the coolant and to ambient air, for example with middle cylinders operating hotter than outer cylinders. Air flow into each combustion chamber may differ due to intake manifold geometry, and exhaust flow out of each combustion chamber may differ due to exhaust manifold geometry. Other sources of variability may include differences in fuel delivery amount or spray pattern due to tolerances associated with the fuel injector 30. While control of the "global" components discussed above may be useful to achieve a desired minimum temperature, desired average temperature, or desired maximum temperature under steady-state conditions, the "global" systems are not able to compensate for the cylinder-to-cylinder differences that impede achieving optimal conditions in all cylinders of a multi-cylinder engine. Additionally, under transient engine operating conditions, i.e. changing engine speed and/or load, the response time of the "global" components to influence combustion chamber temperature may be too slow to allow robust and stable GDCI combustion during the time that the engine is transitioning from one speed/load state to another.

To achieve robust, stable GDCI combustion in a multi-cylinder engine, it is desirable to provide means for influencing the temperature and/or pressure in each individual combustion chamber. One way to achieve this is to provide a plurality of intake air heaters 80, with each cylinder of the engine 12 having an associated intake air heater 80 to increase the temperature of the air entering that cylinder. In a non-limiting embodiment, each heater 80 may be disposed in an intake runner of the intake manifold 158, as depicted in FIG. 2.

Figure 4:
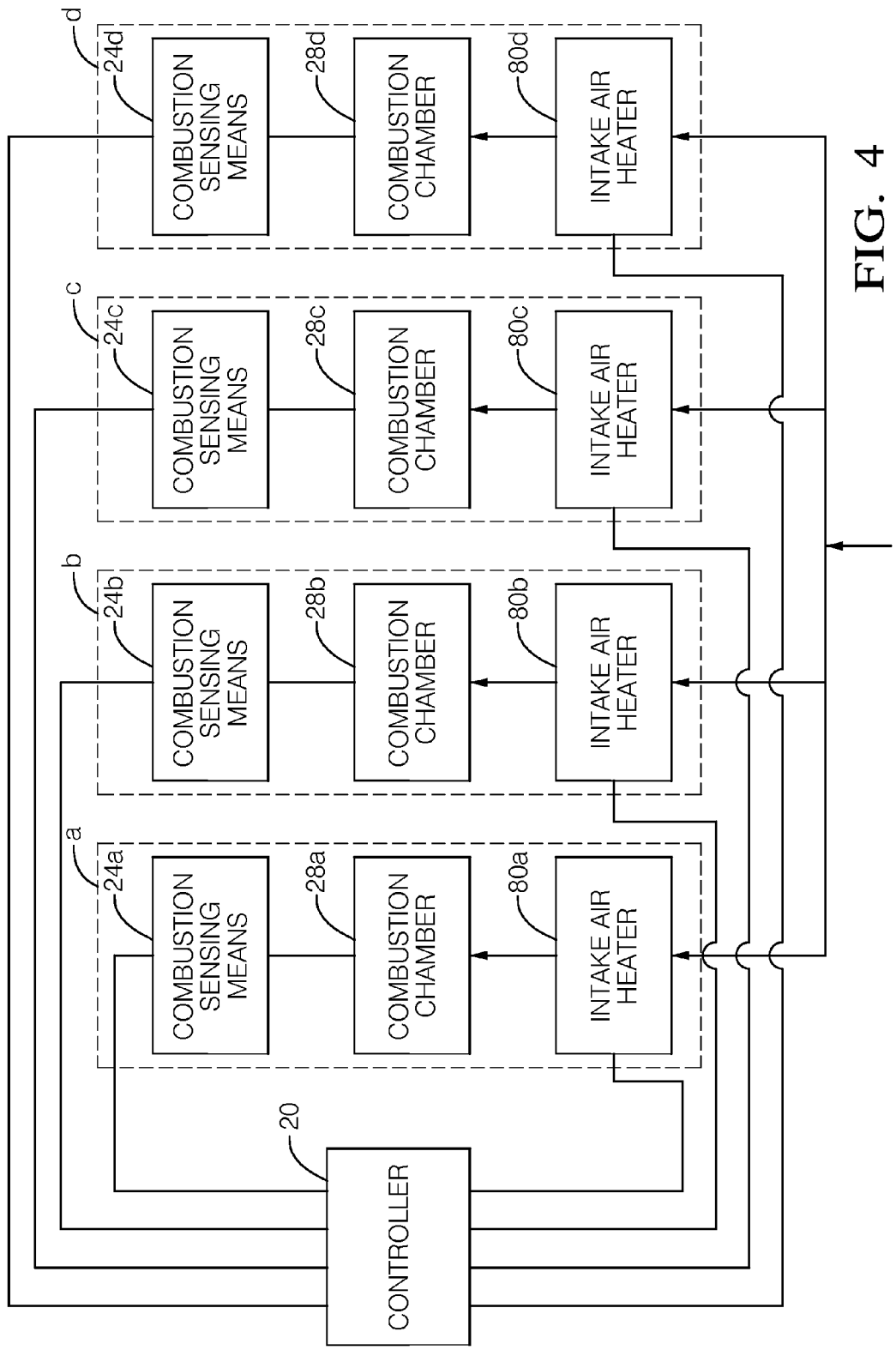
FIG. 4 is a schematic diagram depicting an intake air heater system for a multi-cylinder engine.

FIG. 4 is a schematic diagram depicting an intake air heater system for a multi-cylinder engine. In FIG. 4, lines with arrowheads at one end are used to indicate air flow, with the arrowhead indicating the direction of air flow. FIG. 4 includes dashed boxes denoted as a, b, c, and d, each associated with one of four cylinders in a four cylinder engine. Within each dashed box, features introduced above with reference to FIG. 1 are identified with the reference numeral of FIG. 1 with a letter appended to the numeral, the letter corresponding to the cylinder identification associated with the feature. For example, "80*a*" in FIG. 4 represents the intake air heater 80 that is associated with cylinder "a".

Referring to FIG. 4, an intake air heater 80*a* is configured to heat air entering the intake port of the combustion chamber 28*a*. When GDCI combustion occurs in the combustion chamber 28*a*, combustion characteristics are detected by the combustion sensing means 24*a*. A signal from the combustion sensing means 24*a* indicative of a combustion characteristic in combustion chamber 28*a* is provided to the controller. The controller is configured to provide a control signal to the air intake heater 80*a* in response to the combustion characteristic detected by the combustion sensing means 24*a*, thereby enhancing the robustness of GDCI combustion in the combustion chamber 28*a*. A corresponding relationship exists between the corresponding components within each of the other cylinders "b", "c", and "d", As indicated in FIG. 4, each of the cylinders a, b, c, d is associated with a corresponding intake air heater 80*a*, 80*b*, 80*c*, and 80*d* respectively. Each of the cylinders a, b, c, and d additionally has a corresponding combustion sensing means 24*a*, 24*b*, 24*c*, and 24*d* respectively. The controller is configured to receive signals from each individual combustion sensing means 24*a*, 24*b*, 24*c*, 24*d* indicative of a combustion characteristic in that cylinder, and to provide an appropriate control signal to an individual intake air heater 80*a*, 80*b*, 80*c*, 80*d* to influence the intake air temperature in that cylinder, where each control signal based on the combustion characteristic measured in the respective combustion chamber 28*a*, 28*b*, 28*c*, 28*d*. Accordingly, the temperature in each cylinder can be optimized to maximize the robustness of GDCI combustion in each individual cylinder beyond the capabilities of the "global" components described above.

In an embodiment of the invention, a plurality of temperature sensors may be provided, with one of the plurality of temperature sensors associated with each of the heaters 80*a*, 80*b*, 80*c*, 80*d*. By way of non-limiting example, a temperature sensor may be disposed so as to directly measure a temperature of a particular heater 80, a temperature of air in the intake manifold 158 heated by a particular heater 80, or a temperature in a particular combustion chamber 28 that receives air heated by a particular heater 80. Information from the temperature sensor may be used to influence the control of power to the particular heater, for example to limit the heater power so as not to exceed a predetermined maximum heater temperature.

Control of each heater 80*a*, 80*b*, 80*c*, 80*d* may be achieved, for example, by using solid state relays (not shown) to control current through each heater 80*a*, 80*b*, 80*c*, 80*d*. The heat delivered by each heater 80*a*, 80*b*, 80*c*, 80*d* may be controlled, for example, by pulse width modulation of the current through the heater 80*a*, 80*b*, 80*c*, 80*d*.

Figure 5:
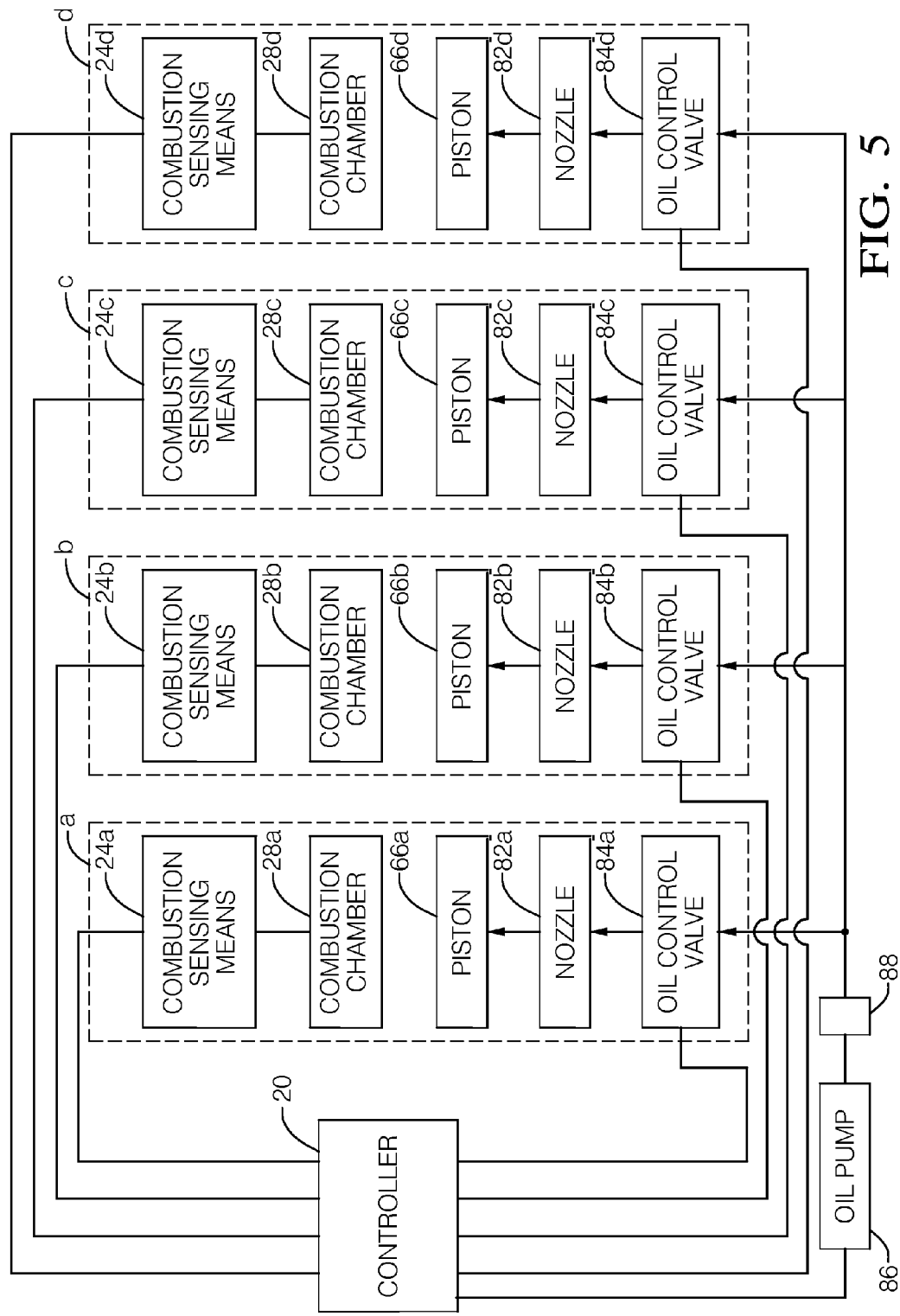
FIG. 5 is a schematic diagram depicting a piston cooling system for a multi-cylinder engine.

In addition to using individually controllable intake air heaters 80*a*, 80*b*, 80*c*, 80*d* to increase combustion chamber temperature on a cylinder-by-cylinder basis, piston cooling by a plurality of individually controllable oil jets may be used to decrease combustion chamber temperature on a cylinder-by-cylinder basis. FIG. 5 is a schematic diagram depicting piston cooling system for a multi-cylinder engine. In FIG. 5, lines with arrowheads at one end are used to indicate oil flow, with the arrowhead indicating the direction of oil flow. FIG. 5 includes dashed boxes denoted as a, b, c, and d, each associated with one of four cylinders in a four cylinder engine. Within each dashed box, features introduced above with reference to FIG. 1 are identified with the reference numeral of FIG. 1 with a letter appended to the numeral, the letter corresponding to the cylinder identification associated with the feature. For example, "82*a*" in FIG. 4 represents the oil nozzle 82 that is associated with cylinder "a".

Referring to FIG. 5, a nozzle 82*a* is configured to spray oil onto the piston 66*a* that partially defines the combustion chamber 28*a*. Oil supply to the nozzle 82*a* is provided by an oil pump 86 through an oil control valve 84*a*. The oil that is sprayed onto the piston 66*a* serves to remove heat from the piston 66*a*, thereby lowering the temperature in the combustion chamber 28*a*. When GDCI combustion occurs in the combustion chamber 28*a*, combustion characteristics are detected by the combustion sensing means 24*a*. A signal from the combustion sensing means 24*a* indicative of a combustion characteristic in combustion chamber 28*a* is provided to the controller. The controller is configured to provide a control signal to the oil control valve 84*a* in response to the combustion characteristic detected by the combustion sensing means 24*a*, thereby enhancing the robustness of GDCI combustion in the combustion chamber 28*a*. A corresponding relationship exists between the corresponding components within each of the other cylinders "b", "c", and "d", As indicated in FIG. 5, each of the cylinders a, b, c, d is associated with a corresponding oil control valve 84*a*, 84*b*, 84*c*, and 84*d* respectively. Each of the cylinders a, b, c, and d additionally has a corresponding combustion sensing means 24*a*, 24*b*, 24*c*, and 24*d* respectively. The controller is configured to receive signals from each individual cylinder indicative of a combustion characteristic in that cylinder, and to provide an appropriate control signal to an individual oil control valve 84*a*, 84*b*, 84*c*, and 84*d* to influence the temperature in that cylinder, where each control signal based on the combustion characteristic measured in the respective combustion chamber 28*a*, 28*b*, 28*c*, 28*d*. Accordingly, the temperature in each cylinder can be optimized to maximize the robustness of GDCI combustion in each individual cylinder beyond the capabilities of the "global" components described above.

Control of each oil control valve 84*a*, 84*b*, 84*c*, and 84*d* may be achieved, for example, by using solid state relays (not shown) to control voltage and/or current to each oil control valve 84*a*, 84, 84*c*, and 84*d*. In the embodiment shown in FIG. 5, each oil control valve 84*a*, 84*b*, 84*c*, and 84*d* is supplied oil by a common oil pump 86. As indicated in FIG. 5, the oil pump 86 is controllable by a signal from the controller 20, thereby reducing parasitic losses when full oil flow or pressure is not required. By way of non-limiting example, the oil pump may be a two-step oil pump or a continuously variable oil pump. The viscosity of oil is dependent on its temperature, and the spray characteristics of the nozzles 82a, 82b, 82c, 82d are dependent on oil pressure and oil viscosity. In a non-limiting embodiment, as shown in FIG. 5, a sensor 88 may be provided to measure the pressure and/or temperature of pressurized oil made available to the oil control valves 84a, 84b, 84c, 84d by the oil pump 86. Alternatively, individual pressure and/or temperature sensors may be provided between each oil control valve 84a, 84b, 84c, 84d and its corresponding nozzle 82a, 82b, 82c, 82d.

For GDCI engine operation using a plurality of intake air heaters 80a, 80b, 80c, 80d to condition intake air to the combustion chambers 28a, 28b, 28c, 28d, part-to-part variability between individual heaters 80a, 80b, 80c, 80d, as well as differences in aging characteristics between individual heaters 80a, 80b, 80c, 80d, may contribute to further cylinder-to-cylinder variability. In an embodiment of the present invention, the control parameters associated with each individual heater 80a, 80b, 80c, 80d, or a relationship between the control parameters associated with each individual heater 80a, 80b, 80c, 80d that produce the desired combustion characteristics, as described above, may be retained in non-volatile memory, for example in the controller 20. These "learned" values may then be used as initial values in determining heater control parameters to be used to control individual heaters 80a, 80b, 80c, 80d during a subsequent engine operating event.

For GDCI engine operation using a plurality of nozzles 82a, 82b, 82c, 82d, each fed by a corresponding oil control valve 84a, 84b, 84c, 84d, to provide piston cooling and thereby influence the temperature in the combustion chambers 28a, 28b, 28c, 28d, part-to-part variability between individual nozzles 82a, 82b, 82c, 82d and oil control valves 84a, 84b, 84c, 84d, as well as aging characteristics of the oil pump 86 and/or differences in aging characteristics between individual nozzles 82a, 82b, 82c, 82d, and oil control valves 84a, 84b, 84c, 84d, may contribute to further cylinder-to-cylinder variability. In an embodiment of the present invention, the control parameters associated with the oil pump 86 and with each individual oil control valve 84a, 84b, 84c, 84d, or a relationship between the control parameters associated with each individual oil control valve 84a, 84b, 84c, 84d, that produce the desired combustion characteristics at each of a plurality of engine speed and load conditions, may be retained in non-volatile memory, for example in the controller 20. These "learned" values may then be used as initial values in determining control parameters to be used to control the oil pump 86 and/or to control individual oil control valves 84a, 84b, 84c, 84d during a subsequent engine operating event at the corresponding engine speed and load conditions.

The combustion sensing means 24 may include a pressure sensor configured to sense the pressure within the combustion chamber 28 and/or a temperature sensor configured to sense the temperature in the combustion chamber. Measurements made by these sensors may be used directly, or may be processed to derive other combustion-related parameters. By way of non-limiting example, control of the intake air heaters 80a, 80b, 80c, 80d, and/or the oil control valves 84a, 84b, 84c, 84d, may be based on combustion chamber temperature, combustion chamber pressure, crank angle corresponding to start of combustion (SOC), crank angle corresponding to 50% heat release (CA50), heat release rate, maximum rate of pressure rise (MPRR), location of peak pressure (LPP), ignition dwell (i.e. elapsed time or crank angle between end of fuel injection and start of combustion), ignition delay (i.e. elapsed time or crank angle between start of fuel injection and start of combustion), combustion noise level, or on combinations of one or more of these parameters.

In a first operating mode of a GDCI engine system, the "global" components that influence combustion chamber temperature as described above may be controlled so as to establish temperatures in each combustion chamber that, absent a heat contribution from the intake air heaters, would be at or below the temperature corresponding to the optimum temperature for robust combustion in all combustion chambers. The intake air heaters 80a, 80b, 80c, and 80d may then be controlled to supply supplemental heat to their corresponding combustion chambers 28a, 28b, 28c, 28d as appropriate to achieve robust combustion in each combustion chamber 28a, 28b, 28c, 28d.

In a second operating mode of a GDCI engine system, the "global" components that influence combustion chamber temperature as described above may be controlled so as to establish temperatures in each combustion chamber that, absent a cooling effect from oil spray on the pistons, would be at or above the temperature corresponding to the optimum temperature for robust combustion in all combustion chambers. The oil control valves 84a, 84b, 84c, 84d may then be controlled to remove heat from their corresponding combustion chambers 28a, 28b, 28c, 28d by cooling their corresponding pistons 66a, 66b, 66c, 66d as appropriate to achieve robust combustion in each combustion chamber 28a, 28b, 28c, 28d.

In a third operating mode of a GDCI engine system, the "global" components that influence combustion chamber temperature as described above may be controlled so as to establish temperatures in each combustion chamber that, absent a heating effect from air intake heaters and a cooling effect from oil spray on the pistons, would be such that at least one combustion chamber would require supplemental heating to achieve the optimum temperature for robust combustion in that combustion chamber, and at least one other combustion chamber would require supplemental cooling to achieve the optimum temperature for robust combustion in that combustion chamber. The intake air heaters 80a, 80b, 80c, 80d, and the oil control valves 84a, 84b, 84c, 84d may then be simultaneously controlled to achieve robust combustion in each combustion chamber 28a, 28b, 28c, 28d.

The first operating mode, second operating mode, and third operating mode as described above may all be employed in a given GDCI engine system at different times, depending on factors including but not limited to engine speed, engine load, engine temperature, ambient temperature, whether the engine is warming up or fully warmed, and whether engine speed and load are in a steady state or a transient state. Selection of an operating mode may be influenced by other factors, such as the desire to minimize parasitic loads on the engine, such as the need to provide energy to the heaters 80a, 80b, 80c, 80d, to the oil control valves 84a, 84b, 84c, 84d, to the oil pump 86, and/or to the coolant pumps 210, 220. Other considerations may also influence the selection of an operating mode. For example, while the engine is warming up, it may be desirable to operate the heaters 80a, 80b, 80c, 80d to provide the maximum air heating that can be accommodated while maintaining robust combustion through control of fuel injection parameters, in order to accelerate light-off of the catalyst 170. In a transient condition, for example when the engine is accelerating, a piston cooling system as depicted in FIG. 5 may provide improved response time for controlling combustion chamber temperature compared with the response time of the "global" components discussed above. This improved response time may enable enhanced stability of the multi-cylinder engine.

While this invention has been described in terms of preferred embodiments thereof, it is not intended to be so limited, but rather only to the extent set forth in the claims that follow.

We claim:

1. A control system for a multi-cylinder compression ignition engine, said engine defining a plurality of cylinders and having a plurality of pistons, each cylinder having a piston reciprocally movable in the cylinder, each piston having a top side and a bottom side, the top side of the piston partially defining a combustion chamber having an air intake port and an exhaust port, the system comprising:
    an air intake path providing combustion air to the engine;
    a heater means comprising a plurality of heaters, each of the plurality of heaters thermally connected to said air intake path and configured to heat air introduced into one individual cylinder of the plurality of cylinders;
    a heater control means configured to control electrical power to the heater means;
    a sensor means for determining a combustion parameter for combustion occurring in each individual cylinder of the plurality of cylinders; and
    a controller means configured to calculate a desired electrical power to be supplied to each heater of the plurality of heaters based on the combustion parameter for combustion occurring in the cylinder into which air is introduced that the heater is configured to heat, said controller means further configured to control said heater control means to adjust the electrical power to each heater of the plurality of heaters based on the calculated desired electrical power to be supplied to the heater;
    wherein the heater means is controlled so as to produce an elevated combustion temperature beyond a minimum combustion temperature that is required to achieve stable combustion, so as to provide heat to a catalyst disposed in an exhaust system of the engine, while the engine is controlled to maintain stable combustion.

2. The control system of claim 1, further comprising a temperature sensor configured to measure a temperature associated with a particular heater of the plurality of heaters.

3. The control system of claim 2 wherein the measured temperature is used to adjust a target electrical power to be supplied to the heater.

4. The control system of claim 2, wherein the measured temperature is a heater temperature.

5. The control system of claim 4, wherein the electrical power to the particular heater is controlled so as to not exceed a predetermined maximum heater temperature.

6. The control system of claim 2, wherein the measured temperature is an air temperature measured in the air intake path.

7. The control system of claim 2, wherein the measured temperature is a combustion chamber temperature.

8. The control system of claim 1, wherein each heater is controlled such that all cylinders operate with similar combustion phasing and burn characteristics.

9. The control system of claim 1, wherein the combustion parameter is selected from the group consisting of combustion chamber temperature, combustion chamber pressure, crank angle corresponding to start of combustion (SOC), crank angle corresponding to 50% heat release (CA50), heat release rate, maximum rate of pressure rise (MPRR), location of peak pressure (LPP), ignition dwell, ignition delay, combustion noise level, and combinations of one or more of these parameters.

10. The control system of claim 1, wherein the controller means includes a learning section that determines and retains in memory a learned heater control parameter for the plurality of heaters based on the combustion parameter.

11. The control system of claim 10 wherein the learning section modifies the learned heater control parameter over time.

12. A method for influencing combustion in a multi-cylinder compression ignition engine, the method comprising the steps of:
    determining a combustion parameter for combustion taking place in a cylinder of the engine; and
    controlling power supplied to a heater configured to heat air introduced into the cylinder, the power supplied to the heater based on the combustion parameter;
    wherein the heater is controlled so as to produce an elevated combustion temperature beyond a minimum combustion temperature that is required to achieve stable combustion, so as to provide heat to a catalyst disposed in an exhaust system of the engine, while the engine is controlled to maintain stable combustion.

13. The method of claim 12, wherein the engine includes means for determining a value for the combustion parameter for combustion taking place in each individual cylinder of the engine, and the engine additionally comprises means for independently controlling power to each heater of a plurality of heaters, the plurality of heaters configured to independently supply heat to each individual cylinder in the engine.

14. The method of claim 12, further comprising the step of measuring a temperature in the engine and using the measured temperature to adjust a target power to be supplied to the heater.

15. The method of claim 14 wherein the measured temperature is a heater temperature.

16. The method of claim 14, wherein the measured temperature is a temperature in an intake manifold of the engine.

17. The method of claim 14, wherein the measured temperature is a temperature measured in a combustion chamber of the engine.

18. The method of claim 12, wherein the combustion parameter is selected from the group consisting of combustion chamber temperature, combustion chamber pressure, crank angle corresponding to start of combustion (SOC), crank angle corresponding to 50% heat release (CA50), heat release rate, maximum rate of pressure rise (MPRR), location of peak pressure (LPP), ignition dwell, ignition delay, combustion noise level, and combinations of one or more of these parameters.

19. The method of claim 12, additionally comprising the steps of determining and retaining in memory a learned heater control parameter for the plurality of heaters based on the combustion parameter.

20. The method of claim 19 additionally comprising the step of modifying the learned heater control parameter over time.

* * * * *